Dec. 16, 1952    D. O. OWENS    2,621,421
PLUMB BOB
Filed March 21, 1952
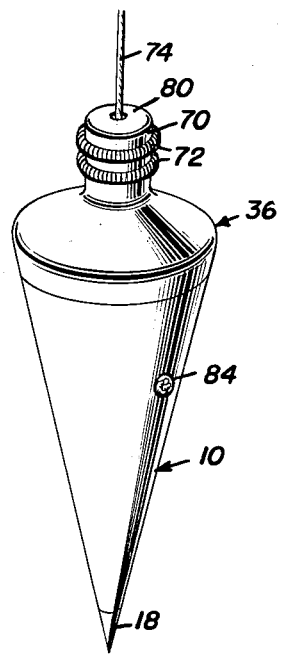
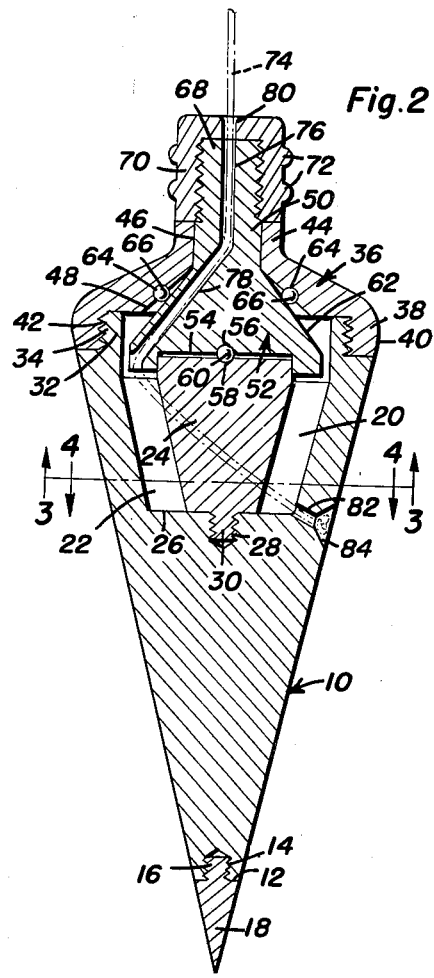
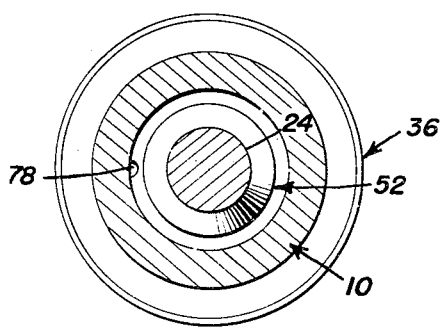
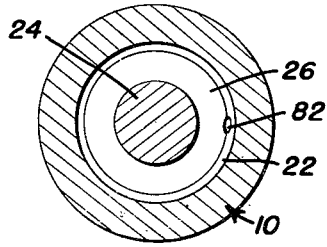
David O. Owens
INVENTOR.
BY Clarence A. O'Brien
and Harvey B. Jacobson
Attorneys Patented Dec. 16, 1952

2,621,421

UNITED STATES PATENT OFFICE 2,621,421

PLUMB BOB

David O. Owens, Thermopolis, Wyo.

Application March 21, 1952, Serial No. 277,797

8 Claims. (Cl. 33—217)

This invention relates in general to plumb bobs and more particular to plumb bobs having spools therein about which the line associated with the plumb bob may be conveniently wound.

The primary object of this invention is to provide an improved plumb bob having means for winding and unwinding an associated line from a spool mounted therein, said means including a rotor which is so mounted that the line will automatically unwind from the spool due to the weight of the plumb bob.

Another object of this invention is to provide an improved plumb bob having a cavity therein in which is mounted a spool and a rotor for winding and unwinding a line thereon, said rotor being mounted on bearings carried by elements of the plumb bob in order that it may be free to rotate.

Another object of this invention is to provide an improved spool mounted within a cavity within a plumb bob for receiving line associated with said plumb bob, said spool being tapered whereby line being wound thereon is moved to the bottom of the spool and thereby providing that each adjacent convolution of line is closely adjacent the next lower convolution in order that a maximum length of line may be wound upon the spool.

Another object of this invention is to provide an improved plumb bob having line winding means mounted therein, said plumb bob being of relatively simple construction and requiring a relatively few number of parts whereby it may be economically manufactured.

A further object of this invention is to provide a plumb bob which is formed with a spool therein for receiving line thereon with means for quickly winding said line upon the spool.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application and in which:

Figure 1 is a perspective view of the improved plumb bob, which is the subject of this invention, the plumb bob being illustrated as hanging from the lower end of its associated line;

Figure 2 is an enlarged longitudinal vertical sectional view taken through the center of the plumb bob of Figure 1 and showing the general construction of the interior thereof and the manner in which the line is secured to the plumb bob;

Figure 3 is a transverse horizontal sectional view taken substantially upon the plane indicated by the section line 3—3 of Figure 2 and showing the general cross section of the various elements thereof; and Figure 4 is a transverse horizontal sectional view taken substantially upon the plane indicated by the section line 4—4 of Figure 2 and looking toward the bottom of the plumb bob.

Similar characters of reference designate similar or identical elements and portions throughout the specification and throughout the different views of the drawings.

Referring now to the drawings in detail, it will be seen that the plumb bob, which is the subject of this invention, includes a generally conical body portion 10 which is provided with a truncated lower end 12. The lower end 12 is provided with a threaded bore 14 in which is threadedly engaged a threaded stud portion 16 of a movable pointed tip 18 for the plumb bob.

The upper and larger end of the conical body portion 10 is provided with an enlarged cavity 20 opening through the upper end thereof and having lower side wall portions 22 which are tapered at the same angle as the taper of the conical body portion. Disposed within the cavity 20 is a spool 24 which is substantially in the shape of a truncated cone having an outer wall which is tapered at the same angle as the wall 22 of the cavity 20 and is parallel thereto. The base of the cavity 20 is referred to by the reference numeral 26 and is provided with a centrally located threaded bore 28 in which is threadedly engaged a threaded stud integral with and projecting downwardly from the bottom of the spool 24. Due to the relationship between the threaded stud 30 and the threaded bore 28, it will be seen that the spool 24 is removably, but rigidly secured within the cavity 20.

The upper end of the conical body portion 10 is provided with an annular recess so as to form an inwardly offset flange portion 32 which is externally threaded as at 34. Secured to the conical body portion 10 and closing the upper end of the cavity 20 is a bell-shaped top 36 which has a downwardly projecting annular flange 38. The annular flange 38 has an outer cylindrical surface 40 which is in alignment with the outer surface of the conical body portion 10, and an internally threaded portion 42 which is threadedly engaged with the threaded portion 34 of the annular flange 32.

The bell-shaped top 36 is also provided with a cylindrical neck portion 44 of reduced diameter, said neck portion having a cylindrical bore 46 therethrough. Below the neck portion 44 of the top 36, the bore 46 tapers outwardly to form a seat 48.

Disposed within the cavity 20 and having an axle portion 50 extending through the bore 46 is a rotor 52. The rotor 52 has a concentric circular recess 54 in its lower end in which is received the upper end portion of the spool 24. The rotor 52 and the spool 24 are provided with vertically aligned substantially semi-spherical recesses 56 and 58, respectively, in which is received a ball bearing 60 which provides for free rotation of the rotor 52 with respect to the spool 24.

It will be noted that the rotor 52 tapers outwardly from its axle portion 50 to its lower end so as to provide an upper bearing engaging surface 62. Disposed within recesses 64 in the seat portion 48 of the top 36 are ball bearings 66 which engage the bearing surface 62 of the rotor 52 and provide free rotation thereof with respect to the top 36.

In order that the rotor 52 may be conveniently rotated, it is provided with a threaded upper end 68 on which is threadedly engaged a cap member 70. It will be noted that the cap member 70 when fully threaded upon the threaded upper end 68 of the rotor 52, has its lower edge in slightly spaced relation with respect to the upper edge of the neck portion 44 of the top 46. In order that the cap 70 may be conveniently rotated, it is provided with knurled ring portions 72.

In order that the plumb bob may be provided with a chalk line 74, the rotor 52 has its axle portion 50 and threaded upper end portion 68 provided with a concentric vertical bore 76 which communicates with a sloping bore 78 through the bottom portion of the rotor. The lower end of the sloping bore 78 opens into the cavity 20, and the upper end of the concentric bore 76 is in alignment with a concentric bore 80 through the cap 70. The chalk line 74 is passed through the communicating bore 76 and 78 into the cavity 20. In order that the lower end of the chalk line 74 may be easily secured to the plumb bob, the conical body portion 10 is provided with a bore 82 extending through the wall thereof and communicating the cavity 20 with the exterior of the plumb bob. The outer end of the bore 82 is enlarged to form a recess 84 in which a knot may be retained.

When it is desired to wind the chalk line 74 upon the spool 24, the cap 70 is rubbed across the palm of the hand thereby rotating it and its associated rotor 52. Due to the eccentric location of the lower end of the bore 78, the line 74 is wound around the spool 24. Inasmuch as the spool 24 is tapered downwardly, each convolution of the line 74 is forced downwardly by the next convolution and the line is wound closely around the spool 24. Due to the mounting of the rotor 54 on ball bearings, it is free to rotate and when it is desired to unwind the chalk line 74 from the spool 20, it is merely necessary to hold the upper end thereof and the weight of the plumb bob will unwind the chalk line automatically. When the chalk line 74 is completely unwound from the spool 24, further downward movement of the plumb bob is prevented by the knotted end of the chalk line 74 engaging in the recess 84 and the plumb bob assumes the relation illustrated in Figure 2.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. A plumb bob comprising a substantially conical body having an enlarged cavity in its large end, a fixed spool mounted within said cavity, a rotor partially disposed within said cavity, means for retaining said rotor in position whereby line carried by said plumb bob on said spool will unwind due to the weight of the plumb bob.

2. A plumb bob comprising a substantially conical body having an enlarged cavity in its large end, a fixed spool mounted within said cavity, a rotor partially disposed within said cavity, means for retaining said rotor in position whereby line carried by said plumb bob on said spool will unwind due to the weight of the plumb bob, said retaining means including a top removably mounted on the large end of said conical body and closing said cavity.

3. A plumb bob comprising a substantially conical body having an enlarged cavity in its large end, a fixed spool mounted within said cavity, a rotor partially disposed within said cavity, means for retaining said rotor in position whereby line carried by said plumb bob on said spool will unwind due to the weight of the plumb bob, said rotor having a bore therethrough through which said line passes, said bore communicating with said cavity adjacent said spool and exteriorly thereof.

4. A plumb bob comprising a substantially conical body having an enlarged cavity in its large end, a fixed spool mounted within said cavity, a rotor partially disposed within said cavity, means for retaining said rotor in position whereby line carried by said plumb bob on said spool will unwind due to the weight of the plumb bob, said cavity being inwardly tapered, said spool having an exterior similarly tapered, said spool being removably secured to said conical body.

5. A plumb bob comprising a substantially conical body having an enlarged cavity in its large end, a fixed spool mounted within said cavity, a rotor partially disposed within said cavity, means for retaining said rotor in position whereby line carried by said plumb bob on said spool will unwind due to the weight of the plumb bob, said rotor having a portion extending through said retaining means, a cap carried by said rotor for rotating same whereby the line may be wound upon said spool.

6. A plumb bob comprising a substantially conical body having an enlarged cavity in its large end, a fixed spool mounted within said cavity, a rotor partially disposed within said cavity, means for retaining said rotor in position whereby line carried by said plumb bob on said spool will unwind due to the weight of the plumb bob, said spool providing a bottom seat for said rotor, bearing means disposed between said rotor and said spool.

7. A plumb bob comprising a substantially conical body having an enlarged cavity in its large end, a fixed spool mounted within said cavity, a rotor partially disposed within said cavity, means for retaining said rotor in position whereby line carried by said plumb bob on said spool will unwind due to the weight of the plumb bob, said line extending from said cavity through said conical body and having an end thereof seated in a recess in the exterior surface of said conical body.

8. A plumb bob comprising a substantially conical body having an enlarged cavity in its large end, a fixed spool mounted within said cavity, a rotor partially disposed within said cavity, means for retaining said rotor in position whereby line carried by said plumb bob on said spool will unwind due to the weight of the plumb bob, said retaining means including a top removably mounted on the large end of said conical body and closing said cavity, said top having a tapered internal seat receiving a correspondingly tapered bearing surface, bearing means disposed between said top and said rotor.

DAVID O. OWENS.

No references cited.